3,303,745
HORIZONTAL BORING AND CUTTING MILL
Hans Heinrich Moll, Essen-Bredeney, and Gert Dickore, Essen-Haarzopf, Germany, assignors to Beteiligungs- und Patentverwaltungsgesellschaft mit beschränkter Haftung, Essen, Germany
Filed Apr. 12, 1965, Ser. No. 447,390
Claims priority, application Germany, Apr. 18, 1964, B 76,400
4 Claims. (Cl. 90—11)

The present invention relates to a horizontal boring and cutting mill with an upright stand, a carriage movable upwardly and downwardly on said stand and with a headstock connected to said carriage, said headstock being rotatable about a horizontal axis transverse to the working spindle.

With a heretofore known mill of the above mentioned type, the setting is effected in customary manner by moving the work piece by means of a clamping table and by moving the working spindle by means of the carriage and the head stock. The machining tool is by means of said working spindle moved to the area to be machined of the workpiece. If it is necessary to exchange the machining tool or to reset the machining tool, for instance when holes of different diameters are to be bored, the working spindle is, together with the machining tool, withdrawn, and the necessary setting operations are effected while the working spindle is at a standstill. The time required for this operation is, of course, lost from the main time or machining time proper.

It is, therefore, an object of the present invention to provide a horizontal boring and cutting mill which will overcome the above mentioned drawbacks.

It is another object of this invention to provide a horizontal boring and cutting mill which will make it possible to restrict the interruption of the main time to a minimum while still giving the machine setter ample time to reset the machine or tools.

Figure 1:
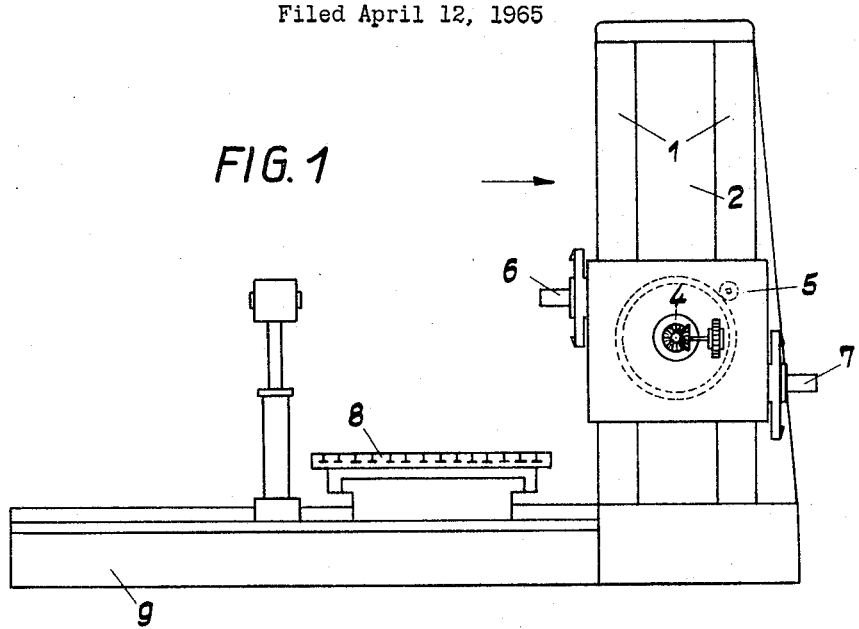

These and other objects and advantages of the invention will appear more clearly from the following specification in connection with the accompanying drawing, in which:

FIG. 1 diagrammatically illustrates an end view of a horizontal boring and cutting mill according to the present invention.

Figure 2:
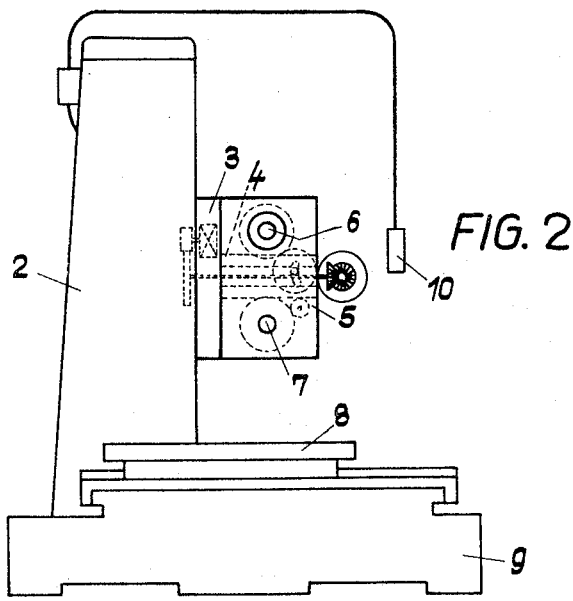

FIG. 2 shows the mill of FIG. 1 as seen in the direction of the arrow A.

A horizontal boring and cutting mill according to the present invention is characterized primarily in that the headstock is equipped with two parallel working spindles located in a common plane perpendicular to the axis of rotation of the headstock. These working spindles are so arranged that their spacing from the axis of rotation of the headstock—said axis being located between said working spindles—is the same, while each of said working spindles is provided with machining tool receiving sections, said sections facing away from each other.

According to a further feature of the present invention, the working spindles may be equipped with driving means permitting a selective driving of each of the working spindles. The carriage or the headstock may be provided with abutments of any standard type which will limit the turning movement of the headstock to an angle of 180° in either direction. If desired, also fluid operable abutment means may be used for this purpose.

Referring now to the drawing in detail, the boring and cutting mill illustrated therein comprises an upright stand 2 with guiding means 1 on which there is slidably mounted a carriage 3 adapted to move upwardly and downwardly on said guiding means 1. Through the intervention of a shaft 4, carriage 3 supports a headstock 5 which is rotatable about the axis of shaft 4. Headstock 5 carries two working spindles 6 and 7.

The mill shown in the drawing furthermore comprises a clamping table 8 which is mounted on a machine bed 9 so as to be movable thereon toward and away from stand 2. The various movements of the elements on the mill are controlled by a control pendulum 10. A drive is adapted to operate the respective spindle adjacent the workpiece to be machined. When, for instance, working spindle 6 is driven, working spindle 7 may be at a standstill.

If it is desired, for instance, to increase a bore in a plurality of steps, following the setting of the machine, first the first chip is removed by means of the machining tool on working spindle 6. At the same time, the machining tool on spindle 7 is reset for a somewhat larger diameter. After the working operation of working spindle 6 has been completed, working spindle 6 is stopped and withdrawn. Subsequently, headstock 5 is turned by 180° about shaft 4. Thereupon, working spindle 7 is driven and advanced for carrying out the next boring operation. In the meantime, the machining tool on spindle 6 can be reset or replaced by a corresponding machining tool so that this machining tool may be made effective for carrying out a machining operation after reset working spindle 7 has finished its machining operation and has been withdrawn.

For purposes of supporting headstock 5 on carriage 3, a hollow shaft may be employed by means of which working spindles 6, 7 are driven by a motor supported by stand 2 or carriage 3. For this purpose, arrangements may be employed which will permit a selective coupling or uncoupling of one or the other working spindle with the driving motor.

For purposes of turning head stock 5, either the latter or carriage 3 may be provided with a gear ring meshing with the pinion of a tilting motor supported by carriage 3 or headstock 5.

As will be evident from the above, the mill according to the present invention makes it possible during the working with one working spindle simultaneously to reset the machining tool on the other working spindle which is at a standstill so that the other working spindle will be ready for the next working operation as soon as the respective working spindle carrying out a machining operation has completed its working operation. In this way, considerable time is gained because due to the required high precision in setting the tools, considerable time is required for such setting operation.

It is, of course, to be understood that the present invention is, by no means, limited to the particular arrangement shown in the drawing but also comprises any modifications within the scope of the appended claims.

Thus, it is, of course, also possible additionally to equip the working spindles 6 and 7 with face plates or chuck tables so that also the working operations carried out by such plates or tables can be speeded up. Furthermore, working spindles 6 and 7 may be supported by a steady rest supported by the machine bed.

What we claim is:
1. A horizontal boring and cutting mill, which includes: an upright stand, a carriage movable on said stand in upward and downward direction, a headstock supported by said carriage and rotatable about a horizontal axis, and two working spindles journalled in said headstock and having their axes located on opposite sides of said horizontal axis in parallel spaced relationship to each other and in a common plane perpendicular to said horizontal axis, each of said working spindles having a tool receiving section and being spaced from said horizontal axis by substantially the same distance and being movable into a substantially horizontal working position by turning said headstock about said horizontal axis, said tool receiving sections respectively being located on opposite sides of said headstock.

2. A horizontal boring and cutting mill according to claim 1, which includes driving means operatively connected with said working spindles and operable selectively to drive each one of said working spindles only at a time.

3. A horizontal boring and cutting mill according to claim 1, which includes separate driving means respectively operatively connected with said working spindles for respectively and selectively individually driving said working spindles.

4. An arrangement according to claim 1, which includes fluid operable abutment means for limiting the rotative movement of said headstock.

References Cited by the Examiner
FOREIGN PATENTS

| | | |
|---|---|---|
| 898,695 | 5/1963 | France. |
| 548,012 | 9/1942 | Great Britain. |

WILLIAM W. DYER, Jr., *Primary Examiner.*

G. A. DOST, *Assistant Examiner.*